United States Patent [19]

Custer

[11] Patent Number: 4,796,473

[45] Date of Patent: Jan. 10, 1989

[54] LEVEL SENSING SYSTEM

[75] Inventor: Craig S. Custer, Pompano Beach, Fla.

[73] Assignee: Chem Tec Equipment Corp., Deerfield Beach, Fla.

[21] Appl. No.: 45,980

[22] Filed: May 4, 1987

[51] Int. Cl.⁴ ............................................. G01F 23/12
[52] U.S. Cl. ................................... 73/308; 73/DIG. 5; 200/84 C; 340/624
[58] Field of Search ............ 73/308, 309, 313, DIG. 5; 200/84 C; 324/251, 207

[56] References Cited

U.S. PATENT DOCUMENTS

| 3,242,474 | 3/1966 | Gast et al. | 200/84 C |
| 4,361,835 | 11/1982 | Nagy | 73/313 X |
| 4,627,283 | 12/1986 | Nishida et al. | 73/308 X |

Primary Examiner—Daniel M. Yasich
Attorney, Agent, or Firm—Melvin K. Silverman

[57] ABSTRACT

Disclosed is a system for sensing the level of a body of liquid within a container. The system includes a shaft secured parallel to a vertical axis of said container, said shaft having a magnetically responsive digital switch. Further provided is a toroidally-shaped reference element situated circumferentially about the shaft and secured at fixed level thereto, the reference element having a magnetic axis which is co-directional with the axis of the shaft. Also provided is a toroidally-shaped measuring sensing element also situated circumferentially about said shaft and vertically above said reference element but without securement thereto, said sensing element having a magnetic axis co-directional with the axis of said shaft and having a polarity of the magnetic axis which is repulsive in relationship to the magnetic axis of the reference element. The measuring element may possess a circumferential interior formed of a material having a negative buoyancy relative to the specific gravity of the level of the liquid to be measured. The reference and sensing elements will repel each other as long as they are within the magnetic proximity of each other, thusly causing the sensing element to float above the level of the reference element. The relative buoyancy of said sensing element will increase as a function of the level of the body of liquid of said sensing element, thereby causing the distance between said sensing and reference elements to change relative to changes in the level of the body of liquid, which changes are monitored by the magnetic actuation of the digital switches.

6 Claims, 3 Drawing Sheets

LEVEL SENSING SYSTEM

BACKGROUND OF THE INVENTION

The present invention relates to a system for the measurement of changes in the level of a body of liquid within a container. More particularly, the present invention is concerned with the use of float elements to selectively actuate one or more of a plurality of digital switches.

The prior art in the instant area is not well-defined and, to the knowledge of the inventor, does not deal with the problem of measurement of liquid levels in the manner set forth herein. Also, the prior art, as known to the inventor, is not capable of measurement of specific gravity of the liquid whose liquid level is being measured.

Prior art float measurement means employing magnetic fields as the actuation means for digital switches appear in U.S. Pat. No. 3,200,645 (1965) to Levins, entitled Electric Position Sensor; U.S. Pat No. 3,419,695 (1968) to Dinkelkane, entitled Float Switches Assembly; and U.S. Pat. No. 3,646,293 (1972) to Howard, entitled Electrical Signal Generator and Liquid Level Indicator, all of the above being classified in U.S. Class 200, subclass 84C.

The above prior art, and other art known to the inventor, does not set forth a system making use of the forces of negative buoyancy of the sensing element, magnetic repulsion between sensing elements, and specific gravity of the sensed medium to produce output data suitable for translation into information regarding liquid level and specific gravity of the measured liquid. It is to this end that the present invention is addressed.

SUMMARY OF THE INVENTION

The instant invention comprises a system for sensing the level of a body of liquid within a container. The system comprises a shaft secured parallel to a vertical axis of said container, said shaft having therein a vertical plurality of magnetically responsive digital switches. Further provided is a toroidally-shaped reference element situated circumferentially about said shaft and secured at fixed level thereto, said reference element having a magnetic axis which is co-directional with the axis of said shaft. Further provided is a toroidally-shaped measuring and sensing element also situated circumferentially about said shaft and vertically above said reference element but without securement thereto, said sensing element having a magnetic axis co-directional with the axis of said shaft and having a polarity of said magnetic axis which is repulsive in relationship to said magnetic axis of said reference element. Said measuring element is formed of a material having a negative buoyancy relative to the specific gravity of the level of the liquid to be measured.

Said reference and sensing elements will repel each other as long as they are within the magnetic proximity of each other, thereby causing said sensing element to float above the level of said reference element. The relative buoyancy of said sensing element will increase as a function of the level of the body of liquid above said sensing element, thereby causing the distance between said sensing and reference elements to change in direct relation to changes in the level of the said body of liquid, which changes are monitored by the magnetic actuation of said digital switches.

It is accordingly an object of the present invention to provide a negative buoyancy system for the sensing of the level of a body of liquid held within a container.

It is another object to provide a sensing system that will monitor both change and rate of change of the level of a body of liquid held within a container.

It is a further object to provide a sensing means which will monitor changes both of liquid level and of specific gravity of the measured liquid.

The above and yet other objects and advantages of the present invention will become apparent from the hereinafter set forth detailed Description of the Invention, the Drawings, and claims appended herewith.

DETAILED DESCRIPTION OF THE INVENTION

Figure 1:
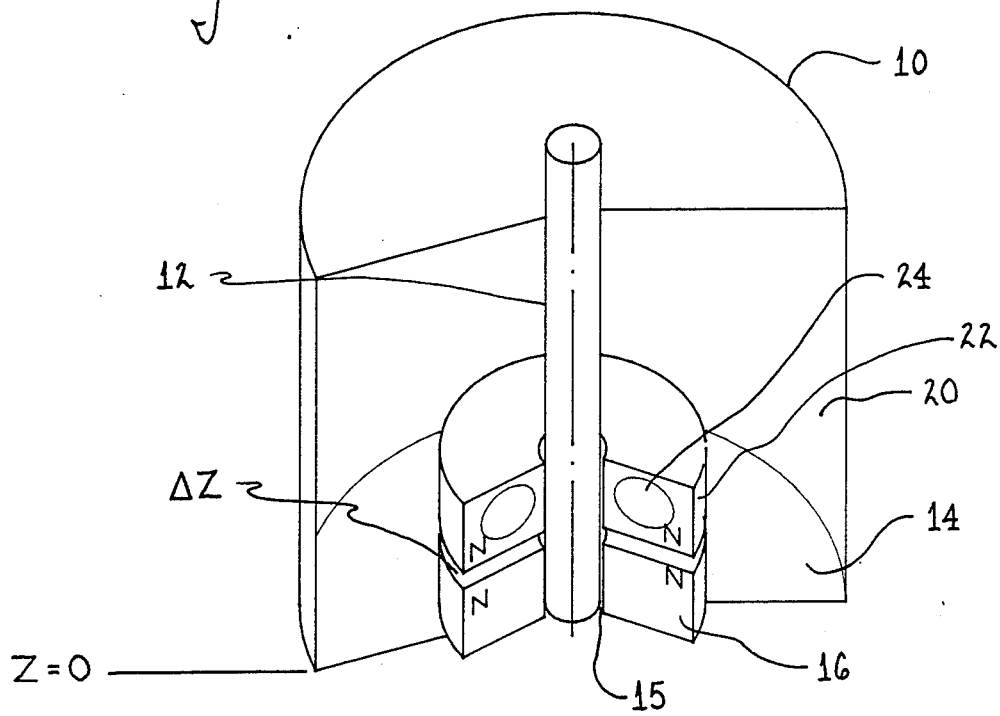
FIG. 1 is a perspective schematic view of the instant sensing system located within a liquid holding container.

With reference to the perspective view of FIG. 1, there is shown a container 10 having a bottom 14.

Vertically oriented within said container 10 and optionally secured to said bottom 14 is shaft 12. Within said shaft 12 is disposed a plurality of digital switching elements 28, 30 and 32, such as reed switches. Each of said switching elements are magnetically responsive.

Further provided is a toroidally-shaped, reference element 16 situated circumferentially about said shaft 12 and secured at surface 15 to said shaft 12. Said reference element 16 is provided with a magnetic axis which is co-directional with the axis of said shaft 12.

Further provided is a toroidally-shaped, measuring and sensing element 22 also situated circumferentially about said shaft 12 and vertically above said reference element 16, however, without securement thereto. Said measuring element 22 is provided with a magnetic axis which is co-directional with the axis of said reference element. However, its polarity is repulsive in relationship to the magnetic axis of said reference element 16. This repulsive relationship of the respective magnetic axes of elements 16 and 22 is represented by the letters "NN" in the figures.

Said measuring element 22 is provided with a hollow circumferential cavity 24 formed of a material having a negative buoyancy relative to the specific gravity of the liquid 26 to be measured. In a common embodiment, the material of circumferential cavity 24 may simply be that of air, however, it is to be borne in mind that cavity 24 may be formed of any material having a lesser specific gravity than the specific gravity of the liquid which is to be measured.

Figure 2:
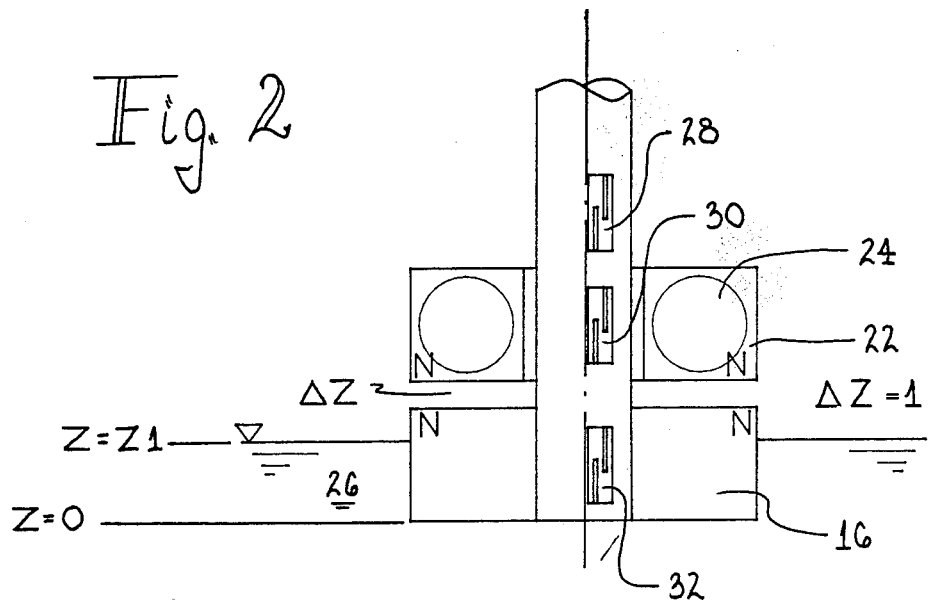
FIG. 2 is a radial cross-sectional schematic view of the sensing system showing the liquid level below that of the level of the reference sensor.

As may be noted in FIG. 2, the mutual magnetic repulsion between reference element 16 and sensing element 22 will cause sensing element 22 to be suspended above reference element 16 at a level indicated as ΔZ=1 when liquid 26 is at level Z1, this being the level below that of the top of reference element 16.

Figure 3:
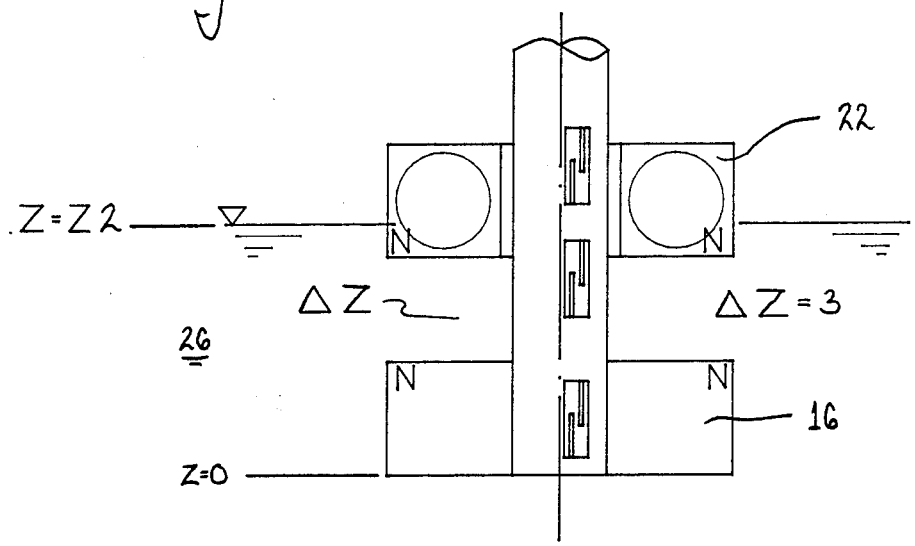
FIG. 3 is a radial view, similar to that of FIG. 2, showing the level of the liquid at a second level.

In FIG. 3, liquid 26 is shown at level Z2, this being a level above the bottom of sensing element 22 but below the top thereof. Under this condition, the combined effect of the negative buoyancy of sensing element 22 and of magnetic repulsion will lift sensing element 22 to a level of ΔZ=3.

Figure 4:
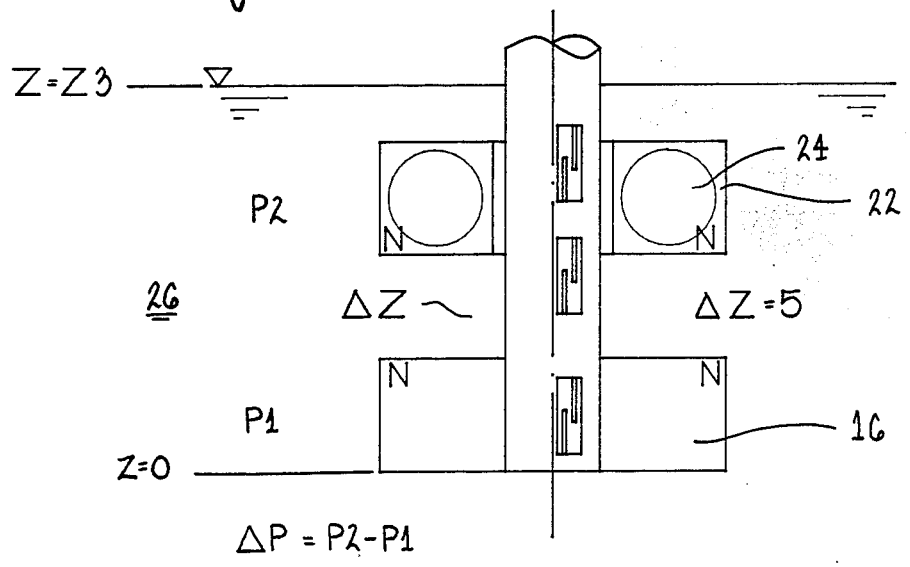
FIG. 4 is a radial view, similar to that of FIGS. 2 and 3, however showing the liquid level at a higher level.

In FIG. 4, liquid 26 is shown at level Z3. This level of liquid 26 will create a greater external pressure upon the top of sensing element 23 which, in turn, will bring about a greater differential in pressure between the external surface of element 22 and the internal pressure within circumferential cavity 24. Accordingly, the higher the level of liquid 26, the greater will be the pressure differential between the inside and the outside of sensing element 26.

Therefore, an increase in the level of liquid 26 will cause sensing element 22 to elevate upward in direct relationship to the increase of the level of the liquid. This may be noted in FIG. 4 in that, as the level of liquid 26 increases from Z2 to Z3, the vertical displacement ΔZ between elements 22 and 16 increases from three units to five units.

Figure 5:
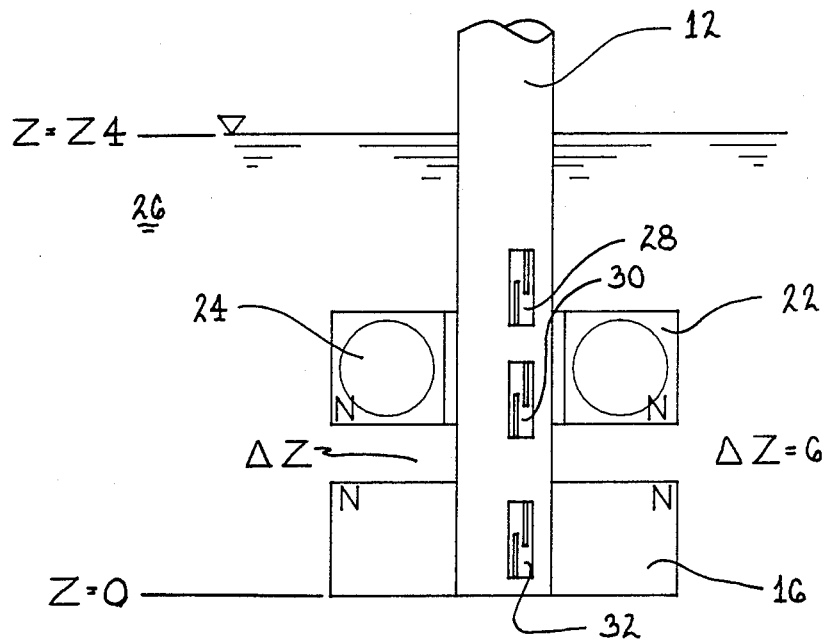
FIG. 5, is a view, similar to that of FIGS. 2 thru 4, however, showing the liquid level at a level above that of FIG. 4.

In FIG. 5, it may be seen that as the level of the liquid rises to level Z4, the vertical displacement between elements 22 and 16 increases yet further to ΔZ=6. This phenomenon may be also viewed as the effect of the enhanced pressure in container 10 acting to squeeze elements 22 and 26 further apart in direct relationship to an increase in the level of liquid 26.

The above discussed buoyancy, that is, the relationship between the internal pressure within element 22 and the exterior pressure thereon is also affected by the specific gravity of the liquid to be measured. Where the specific gravity is greater, the weight upon sensing element 22 will increase more rapidly as the liquid level increases, thereby magnifying the above-described phenomenon. Accordingly, at greater specific gravities, the displacement of Z between sensing element 22 and reference element 16 will occur more rapidly than would be the case with lower specific gravity liquids. Conversely, the increase in Z portrayed in FIGS. 3 thru 5 will occur more slowly where the liquid is of a lower specific gravity.

The above described changes are monitored by said digital switches 28 thru 32 and the inputs thereof fed to appropriate microprocessing means.

It is to be appreciated that a plurality of sensing elements 22 may be employed within a given application.

Accordingly, while there have been shown and described the preferred embodiment of the present invention, it will be understood that the invention may be embodied otherwise than as herein specifically illustrated or described and that within said embodiments certain changes in the detail and construction, and the form of arrangement of the parts may be made without departing from the underlying idea or principles of this invention within the scope of the appended claims.

Having thus described my invention, what I claim as new, useful and, non-obvious, and accordingly secure by Letters Patent of the United States is:

1. A system for sensing the level of a body of liquid in a container, the system comprising:
  (a) a shaft secured parallel to a vertical axis of said container, said shaft having therein a plurality of magnetic position responsive switches;
  (b) a reference element situated circumferentially about said shaft and secured at a fixed level thereto, said reference element having a magnetic axis co-directional with the axis of said shaft; and
  (c) a measuring and sensing element situated circumferentially about said shaft and vertically above said reference element but without securement thereto, said measuring element having a magnetic axis co-directional with the axis of said reference element, said axis having a polarity in repulsive relationship to said magnetic axis of said reference element, said sensing element having a negative buoyancy relative to the specific gravity of said liquid within said container, whereby said reference and sensing elements will magnetically repel each other while they are in magnetic proximity of each other, thereby causing said sensing element to float above the level of said reference element and, further whereby, the relative buoyancy of said sensing element will increase as a function of the level of said body of liquid, thereby causing the distance between said sensing and reference elements to change as a direct function of changes in the level of said body of liquid, which changes are monitored by selective magnetic actuation of said plurality of switches by said sensing element.

2. The system as recited in claim 1, said sensing element having a circumferential interior cavity which cavity is filled with a material having negative buoyancy relative to the specific gravity of the liquid in said container.

3. The system as recited in claim 1 in which said magnetic position responsive switch comprises a hall effect device.

4. The system as recited in claim in which said magnetic position responsive switch comprises a proximity switch.

5. They system as recited in claim 1 in which said magnetic position responsive switch comprises a reed switch.

6. The system as recited in claim 1 in which said magnetic position responsive switch comprises a digital switch.

* * * * *